United States Patent [19]

Darlington et al.

[11] 3,953,572

[45] Apr. 27, 1976

[54] REMOVAL OF BORON FROM $MgCl_2$ BRINES

[75] Inventors: R. Keith Darlington, Salt Lake City; John Wallace Gwynn, Bountiful, both of Utah; Stephen H. Hall, Sr., Sun Prairie, Wis.

[73] Assignee: N L Industries, Inc., New York, N.Y.

[22] Filed: Feb. 21, 1975

[21] Appl. No.: 551,748

[52] U.S. Cl. .............................. 423/158; 423/497; 423/658.5
[51] Int. Cl.² ........................................... C01F 5/30
[58] Field of Search ........... 423/497, 499, 184, 158, 423/658.5

[56] References Cited

UNITED STATES PATENTS

| | | | |
|---|---|---|---|
| 2,132,585 | 10/1938 | Spittle | 423/184 |
| 2,402,959 | 7/1946 | Gustafson et al. | 423/497 X |

OTHER PUBLICATIONS

Hackh's Chem. Dictionary, 4th Ed., 1969, by J. Grant, pp. 124 & 401, McGraw–Hill Book Co., N.Y., N.Y.

*Primary Examiner*—Edward Stern

[57] ABSTRACT

Minute amounts of boron present in naturally occurring brines found in oceans, inland seas, salt lakes and the like are removed by treating the brine with calcium oxide.

1 Claim, No Drawings

REMOVAL OF BORON FROM MgCl₂ BRINES

BACKGROUND OF INVENTION

Molten substantially anhydrous magnesium chloride is a widely used electrolyte for the production of electrolytic magnesium metal; and is commonly derived from brine concentrates comprising essentially magnesium chloride a typical process for producing these brine concentrates from naturally occuring brines being disclosed in U.S. Pat. No. 3516785 and included by reference. In brief, these brine concentrates are produced by subjecting naturally occuring brines to solar evaporation in a series of stages to form what is commonly referred to as a holding pond brine; and thereafter concentrating the holding pond brine in one or more stages to produce a brine concentrate consisting essentially of magnesium chloride, water and trace amounts of other metals and/or metal oxides including boron. This brine concentrate is then dehydrated, preferably by spray drying, and the substantially dry product melted to form a molten electrolyte.

Now it is well known that when a magnesium chloride electrolyte prepared from a brine concentrate and containing boron or a boron compound in proportions equivalent to as little as from 150 to 200 ppm boron is electrolyzed the magnesium metal does not coalesce readily but tends to form as discrete globules dispersed in the cell melt with the result that cell current efficiencies are lowered and significant amounts of magnesium metal end up in the cell smut.

It is important therefore to production of magnesium metal on plant scale that the magnesium chloride electrolyte be substantially free of boron or that the level of boron in the electrolyte be reduced sufficiently that its adverse affects on the coalescence of the magnesium metal and cell efficiencies be minimized.

Known methods for producing magnesium chloride electrolytes having low levels of boron include chlorination of the spray dried magnesium chloride concentrate either during melting of the spray dried material or subsequent thereto. However, removal of boron by chlorination is a slow and expensive process requiring long contact times in the melt cells and/or chlorinators, and the handling of large volumes of gaseous chlorine. As a result melt cell life is seriously shortened and catastrophic feeding and corrosion problems develope.

It is also known to reduce the level of boron in magnesium chloride electrolytes by extracting the boron from a magnesium chloride brine prior to forming the anhydrous cell feed material using liquid-liquid extraction techniques as described, for example, in Pat. Nos. Br 1354944, U.S. 3493349, and U.S. 3433604 wherein extraction of the boron is effected by means of an organic extractant. However, these and other known processes for reducing the level of boron in magnesium chloride brines are prohibitively expensive on a commercial plant scale due to large losses of costly organic additives; or the elaborate and expensive regeneration techniques required to reclaim these additives.

It is desirable therefore, in the interest of the efficient electrolytic production of magnesium metal from salt brines on a commercial scale to provide a relatively simple, inexpensive method and means for forming substantially boron-free magnesium chloride electrolytes from naturally occuring brines consistent with the overall economy of the process.

SUMMARY OF INVENTION

In its broadest aspects then, the present invention is the discovery of a simple and relatively inexpensive method for treating naturally occuring brines derived from Great Salt Lake, Utah and in particular the holding pond brines so that the boron level in the brine is reduced sufficiently, prior to concentration and spray drying, that the necessity for chlorinating the spray dried material to remove boron is eliminated or at least minimized sufficiently to obviate the high cost and catastrophic problems attending present chlorination methods. More particularly it has now been found that these objectives can be achieved by reducing the level of boron in holding pond brines to at least as low as about 150 ppm and preferably less than 50 ppm using an efficient and economical solid-liquid extraction technique characterized by use of an inorganic extractant and in particular calcium oxide. While commercial grade calcium oxide is quite satisfactory it has been found also that a less expensive but equally effective extractant is calcined oolitic sand. Oolitic sand is found in great abundance in the area of Great Salt Lake, Utah and when calcined at temperatures in the range of from about 800° – 950°C for about 24 hours forms CaO plus gaseous $CO_2$. This form of CaO when screened will comprise particles in a size range of about 70% retained on No. 70 sieve, about 2.5% retained on No. 20 sieve and the remainder retained on sieves Nos. 140 to 325. For purposes of brevity the above described calcined oolitic sand is hereinafter referred to, generically as calcium oxide.

PREFERRED EMBODIMENT

Pursuant to the method of this invention a holding pond brine having a specific gravity of about 1.32 and analyzing about: 7.0 to 7.6% Mg as $MgCl_2$, from 0.42 to 0.61% Na, from 0.54 to 0.83% K, from 0.05 to 0.06% Li, from 0.005 to 0.007% Ca, from 3.58 to 4.18% $SO_4$ and from 400 to 550 ppm B, is intimately contacted with calcined oolitic sand having particle size in range from −20 to +325 Standard screen size, in an amount in a range of from 5 to 25% on a brine weight basis and at ambient temperatures or at temperature as high as about 100°C for from 30 to 60 minutes and preferably about 40 minutes after which the mixture is allowed to cool to ambient temperature whereupon the solid extractant is separated from the brine in any suitable manner as for example by filtration, centrifuging or by simply maintaining the slurry in a quiescent state such that the solid extractant settles leaving a supernatant brine from which an appreciable portion of the boron has been removed by sorption in the extractant. If the level of boron in the supernatant brine is still too high following the first treatment then the supernatant brine may be treated again with the calcined oolitic sand in substantially the same manner as hereinabove described to remove any residual boron the treatment process being capable of repetition until the boron level in the brine is reduced to less than 150 parts per million.

The amount of extractant added to the holding pond brine will depend on the composition of the brine which, in turn, will vary depending upon at what point in the process the brine is treated leading to the formation of a brine concentrate. In a plant scale operation the extractant would be added preferably to the hold ing pond brine but it will be understood that the invention comprehends adding the calcium oxide at the desulfating stage or any point thereafter prior to spray drying the concentrated brine, greater amounts of extractant being required with increasing concentrations.

The following examples will further illustrate the novel features of the instant invention.

EXAMPLE I

Oolitic sand was calcined for 24 hours at 800°C to produce finely divided calcium oxide and gaseous $CO_2$ - A screen analysis of the CaO showed that substantially 71% was retained on a No. 70 sieve, about 2.5% on No. 20 sieve and the remainder on sieves numbering from No. 140 to −325. A series of runs were made in which calcined oolitic sand of −20 screen size and in amounts of 1, 5, 10, and 20 gms, respectively, were added to 100 gms holding pond brine which analyzed 7.54 Mg as $MgCl_2$, 4.1% $Na_2SO_4$ and 510 ppm boron. Each mixture was agitated for 40 minutes, attended by an increase in temperature, to form a homogenous slurry. Thereafter the slurries were cooled to ambient temperature, filtered and analyzed for boron and magnesium. Filtrate produced from slurries in which the ratio of calcined oolitic sand to brine was substantially 1:1 showed only slight removal of boron; but the filtrate recovered from slurry of 20 gms sand and 100 gms brine contained only 135 ppm, indicative of the removal of about 325 ppm from the original brine.

EXAMPLE II

A second experiment was run using a calcined oolitic sand of substantially +170 screen size and a holding pond brine which analyzed about 7.28% Mg as $MgCl_2$, and about 510 ppm boron. To 100 gms of this brine were added 10 gms of said sand and the mixture agitated for 40 minutes accompanied by an increase in temperature. At the end of 30 minutes the slurry was allowed to cool and was filtered. The residual brine analyzed about 120 ppm boron.

EXAMPLE III

A third run was made again using calcined oolitic sand except in this run the sand was slaked by the addition of water in the ratio 1 part sand to 4 parts water. Thus 20 gms sand of +325 mesh were slurried with 80 gm water for 30 minutes during which period the temperature increased to about 50°C. The mix was then allowed to cool to ambient temperature. A series of runs were made adding 5, 10 and 20 gms, respectively, of the slurry (equivalent to 1, 2 and 4 gms sand) to 100 gms holding pond brine analyzing 7.54% Mg as $MgCl_2$, about 510 ppm boron and about 0.007% Ca. The mixture was agitated for 40 minutes at ambient temperature and then filtered. The filtrate recovered from the third run contained only 64 ppm boron indicative of substantially 89% removal of boron from the original brine. About 5.4% Mg was present in the filtrate.

EXAMPLE IV

Another run was made using pond brine analyzing about 7.3% Mg as $MgCl_2$ and comprising about 450 ppm boron. 500 gms of this brine were heated to 100°C at which point 25 gms calcined oolitic sand of −20 screen size were added and the mixture agitated for 40 minutes at substantially constant temperature. The slurry was allowed to cool and was then filtered and analyzed for boron. The boron in the filtrate measured about 85 ppm the removal of boron from the brine being about 86.6%. About 6.7% magnesium was present in the brine.

As mentioned above the economies of an extraction process step for removing boron from the brine is especially critical and while earlier extraction processes have had to depend on an efficient regeneration of the extractant the fact that oolitic sand is available in almost limitless supply and at extremely low cost makes regeneration of the extractant unnecessary.

The present invention thus provides a simple and economical method for lowering the brine values in naturally occuring brines to a level of no more than about 150 parts per million to less that 50 parts per million boron the process being characterized by the use of calcined oolitic sand which is highly effective in the removal of boron from naturally occuring brines, is relatively inexpensive and available in sufficient quantities as to make regeneration of the extractant unnecessary.

While the invention has been described and illustrated by the examples included herein it is not intended that the invention be strictly limited thereto and other variations and modifications may be employed within the scope of the appended claims.

We claim:

1. A method for removing boron from a naturally occurring magnesium chloride brine, wherein said brine is a holding pond brine comprising essentially from 7.0 to 7.6% Mg as $MgCl_2$ and from 400–550 ppm boron, which comprises intimately contacting same with a solid extractant added to said brine to form a slurry, said solid extractant consisting of finely divided, screened oolitic sand which has been calcined between 800°–950°C for about 24 hours and the amount of said calcined oolitic sand added to the brine being in the range of from 5 to 25% on a brine weight basis and the mixture maintained at temperatures up to about 100°C and for a period of time from 30 to 60 minutes until the boron is substantially entirely absorbed by said extractant and then maintaining the slurry in a quiescent state to effect gravity separation of the extractant from the purified supernatant brine thus produced.

* * * * *